United States Patent
Won et al.

(10) Patent No.: US 10,399,469 B2
(45) Date of Patent: Sep. 3, 2019

(54) VIBRATION REDUCTION DEVICE FOR VEHICLE SEAT

(71) Applicants: HYUNDAI MOTOR COMPANY, Seoul (KR); KIA MOTORS CORPORATION, Seoul (KR); Hyundai Dymos Inc., Seosan-si, Chungcheongnam-do (KR)

(72) Inventors: Tae Hee Won, Gunpo-si (KR); Gil Ju Kim, Seoul (KR); Chan Ho Jung, Gunpo-si (KR); Sung Chol An, Hwaseong-si (KR); Jin Ho Seo, Suwon-si (KR); Young Min Hyun, Hwaseong-si (KR)

(73) Assignees: HYUNDAI MOTOR COMPANY, Seoul (KR); KIA MOTORS CORPORATION, Seoul (KR); HYUNDAI DYMOS INC., Seosan-si, Chungcheongnam-do (KR)

(*) Notice: Subject to any disclaimer, the term of this patent is extended or adjusted under 35 U.S.C. 154(b) by 0 days.

(21) Appl. No.: 15/825,940

(22) Filed: Nov. 29, 2017

(65) Prior Publication Data

US 2018/0257522 A1 Sep. 13, 2018

(30) Foreign Application Priority Data

Mar. 8, 2017 (KR) .......................... 10-2017-0029511

(51) Int. Cl.
*F16F 1/20* (2006.01)
*B60N 2/54* (2006.01)
*B60N 2/50* (2006.01)
*B60N 2/80* (2018.01)

(52) U.S. Cl.
CPC ............... *B60N 2/54* (2013.01); *B60N 2/503* (2013.01); *B60N 2/80* (2018.02); *B60N 2002/899* (2018.02)

(58) Field of Classification Search
CPC ... B60N 2/44; B60N 2/48; B60N 2/54; B60N 2/90; F16F 15/02
USPC ............... 267/131, 142, 144, 146, 158, 160; 297/391, 410; 248/550
See application file for complete search history.

(56) References Cited

U.S. PATENT DOCUMENTS

| | | | |
|---|---|---|---|
| 5,645,260 A * | 7/1997 | Falangas | F16F 15/005 248/550 |
| 7,155,026 B2 * | 12/2006 | Augustin, Sr. | B60R 11/0223 381/386 |
| 8,540,224 B2 * | 9/2013 | Guthrie | B60G 11/00 267/164 |
| 9,769,974 B2 * | 9/2017 | Cross | A01B 61/046 |
| 2004/0031891 A1 * | 2/2004 | Augustin, Sr. | B60R 11/0223 248/226.11 |

(Continued)

FOREIGN PATENT DOCUMENTS

JP   H10-226255 A   8/1998
JP   2004-116654 A   4/2004

(Continued)

*Primary Examiner* — Christopher P Schwartz
(74) *Attorney, Agent, or Firm* — Morgan, Lewis & Bockius LLP (57) ABSTRACT

A vibration reduction device for a vehicle seat that can reduce forward/backward vibration when the vehicle is stopped with the engine idling. The vibration reduction device includes a weight mounted through an elastic body in the seat back or the headrest of the seat.

11 Claims, 5 Drawing Sheets

(56) References Cited

U.S. PATENT DOCUMENTS

| | | | | |
|---|---|---|---|---|
| 2008/0211151 A1* | 9/2008 | Wieser | ............... | B60N 2/68 |
| | | | | 267/136 |
| 2010/0032256 A1* | 2/2010 | Wieser | ............... | B60N 2/015 |
| | | | | 188/380 |
| 2010/0194008 A1* | 8/2010 | Gunthner | ............... | F16F 1/187 |
| | | | | 267/158 |
| 2014/0312675 A1* | 10/2014 | Okubo | ............... | B60N 2/7017 |
| | | | | 297/410 |
| 2015/0366125 A1* | 12/2015 | Cross | ............... | A01B 61/046 |
| | | | | 172/3 |

FOREIGN PATENT DOCUMENTS

| | | | |
|---|---|---|---|
| JP | 2008-544179 | A | 12/2008 |
| JP | 2012-096743 | A | 5/2012 |
| JP | 5850169 | B2 | 2/2016 |
| JP | 2016-130033 | A | 7/2016 |
| JP | 6134549 | B2 | 5/2017 |
| KR | 10-2008-0042216 | A | 5/2008 |

* cited by examiner

VIBRATION REDUCTION DEVICE FOR VEHICLE SEAT

CROSS-REFERENCE TO RELATED APPLICATION

This application claims under 35 U.S.C. § 119(a) the benefit of priority to Korean Patent Application No. 10-2017-0029511 filed on Mar. 8, 2017, the entire contents of which are incorporated herein by reference.

BACKGROUND (a) Technical Field

The present disclosure relates to a vibration reduction device for a vehicle seat, and more particularly, to a vibration reduction device for a vehicle seat that can reduce forward/backward vibration of a seat when a vehicle is stopped with the engine idling.

(b) Background Art

Seat vibration during engine idling of a vehicle means a phenomenon that a seat is vibrated because a vibration is amplified due to the natural frequency of an idling engine overlapping with the natural frequency of the seat when the vehicle is stopped with the engine idling.

As seat is vibrated in idling, the seat vibration is transmitted to the passenger and makes the passenger feel uncomfortable. Accordingly, in the related art, a weight having predetermined weight was attached to a seat headrest to solve the problem of seat vibration during engine idling to avoid the overlapping of the natural frequency of the engine and the natural frequency of the seat. However, in this case, the weight increases the manufacturing cost and the entire weight, thereby reducing fuel efficiency and profitability.

Further, when the weight of the seat headrest is increased, the following problems are caused.

1. A larger force is required to move up/down the seat headrest, so the commercial value is reduced.

2. The restoring force when the seatback is moved forward/backward is increased, so the user may be injured due to reaction that is generated when the seatback is returned.

3. It is required to increase the strength of a pole guide to prevent damage to a headrest pole guide (connected in a pole shape between a seat headrest and a seatback) when shock is applied to a seat headrest, so the material cost and the weight are increased.

4. Larger load is transmitted by the weight of the seat headrest, so the ability of the seat headrest to protect the passenger's neck is deteriorated.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to solve the problems by providing a vibration reduction device for a vehicle seat that can reduce forward/backward vibration of a seat when a vehicle is stopped with the engine idling, by mounting a weight through an elastic body in the seat back or the headrest of the seat.

The present disclosure provides a vibration reduction device for a vehicle seat in which a weight having predetermined weight is mounted on any one of a seatback top frame and a headrest frame that composes the frame of a seat in a vehicle, that is, the weight is mounted on a seatback top frame or a headrest frame to swing forward/backward in a vehicle through an elastic bracket that can elastically bend so that when the vehicle is stopped with the engine idling, the weight swings and the elastic bracket bends forward/backward, thereby being able to reduce forward/backward vibration of the seat.

According to an embodiment of the present disclosure, when the weight is mounted on a seatback top frame, only the upper end of the weight is bonded to the bottom of the elastic bracket, the elastic bracket is disposed in a space surrounded by the seatback top frame, and the top of the elastic bracket surrounds the upper end of the space and is bonded to a horizontal portion of the seatback top frame.

The weight is not fixed to any part except for the upper end being bonded in the elastic bracket to be swung forward/backward in the opposite direction to vibration of a seat by inertia when the seat vibrates forward/backward.

The weight is mounted on the seatback top frame to be positioned in any one of an upper space and a lower space of the seatback top frame or in the upper space and the lower space.

According to another embodiment of the present disclosure, when the weight is mounted on a headrest frame, only the lower end of the weight is bonded to the top of the elastic bracket and the elastic bracket is bonded to a lower cross member of the headrest frame to be positioned in a space formed between a front frame and a rear frame of the headrest frame.

The weight is not fixed to any part except for the lower end being bonded in the elastic bracket to be swung forward/backward in the opposite direction to vibration of a seat by inertia when the seat vibrates forward/backward. According to the vibration reduction device for a vehicle seat of the present disclosure, when the weight is swung by inertia, the elastic bracket bends in the opposite direction to vibration of the seat, so it can effectively reduce the forward/backward vibration of the seat by the law of action and reaction. Further, the seat vibrates out of the range of the natural frequency of the engine when the vehicle is stopped with the engine idling, so it is possible to suppress seat vibration in idling due to overlap of natural frequencies, whereby it is possible to effectively reduce forward/backward vibration of the seat.

Other aspects and preferred embodiments of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed infra.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

As known in the art, vehicle seats have a seatback for supporting the back of a passenger sitting in the seats and a headrest for supporting the head of the passenger.

Vehicle seats are vibrated forward/backward when the vehicles are stopped with the engine idling and the vibration of the seats is amplified by overlap of the natural frequency of the engine and the natural frequency of the seats (seat vibration in idling).

In the present disclosure, a weight is disposed in a seatback or a headrest and can be vibrated through an elastic member (elastic bracket) in a vehicle so that it is possible to reduce forward/backward vibration of a seat when a vehicle is stopped with the engine idling.

To this end, the present disclosure provides a vibration reduction device for a vehicle seat that includes a weight having predetermined weight and disposed on any one of a seatback top frame and a headrest frame that compose the frame of a seat in a vehicle, in which the weight is mounted on the seatback top frame or the headrest frame and can vibrate forward/backward through an elastic bracket that can elastically bend, whereby it is possible to reduce forward/backward vibration of the seat by vibration of the weight when the vehicle is stopped with the engine idling.

Hereinafter, vibration reduction device for a vehicle seat of the present disclosure will be described with reference to the accompanying drawings for those skilled in the art to easily implement the present disclosure.

First, a vibration reduction device for a vehicle seat according to an embodiment of the present disclosure is described with reference to FIGS. 1 to 4.

Figure 1:
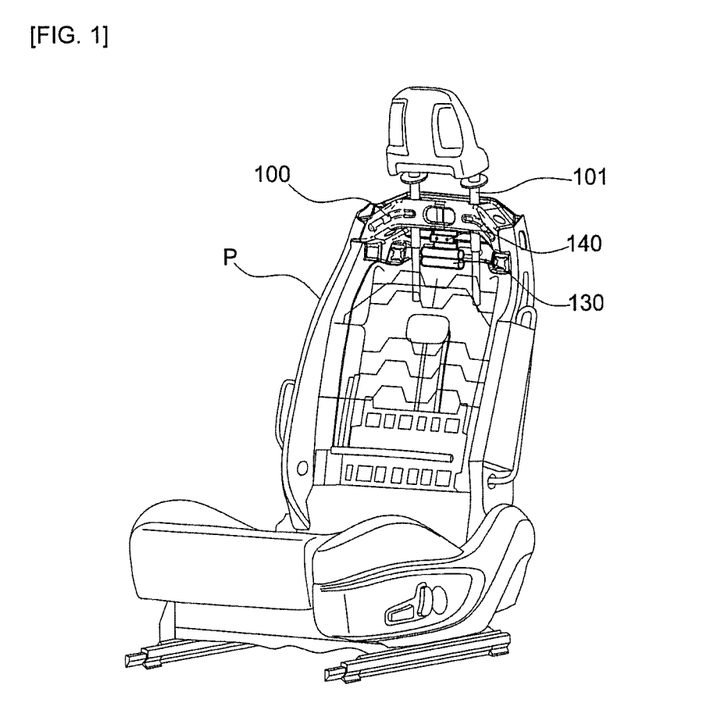
FIGS. 1 and 2 show views showing a seatback top frame equipped with a vibration reduction device for a vehicle seat according to an embodiment of the present disclosure.
Figure 2:
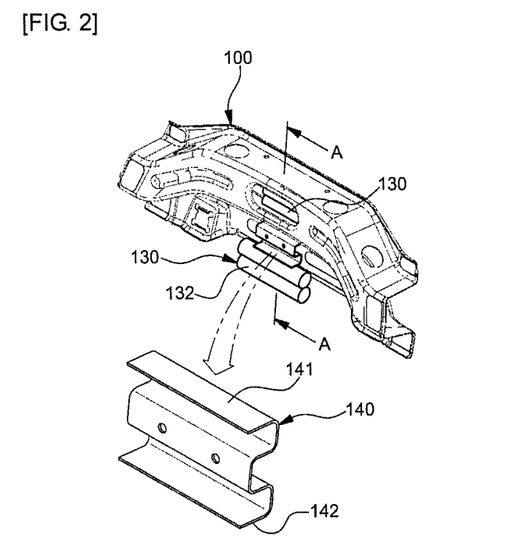
Figure 3:
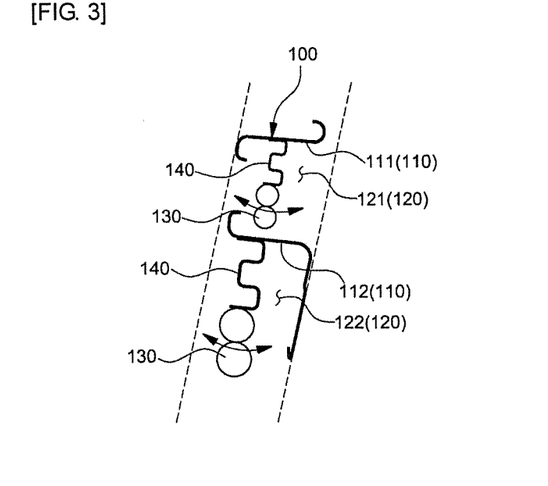
FIG. 3 shows a cross-sectional view taken along line A-A of FIG. 2.

As shown in FIGS. 1 to 3, a vibration reduction device for a vehicle seat includes a weight 130 mounted on a seatback top frame 100 disposed in a seatback of a seat in a vehicle and an elastic bracket 140 connected between the weight 130 and the seatback top frame 100.

A frame module P providing a cushion effect is disposed inside the seatback skin of the seatback to function as a frame and the seatback top frame 100 connected to a headrest frame through a pole guide 101 is disposed at the upper portion of the frame module P.

The weight 130, which is an object having predetermined weight, is hung on the seatback top frame 100 through the elastic bracket 140 so that it can swing forward/backward by inertia when the seat vibrates.

The weight 130 may be a single body or may be composed of a plurality of weight members 132. When a plurality of weight members 132 is connected in a single unit, the weight members 132 are arranged and bonded in a line. If the weight members 132 have a rod shape having a circular cross-section, they are bonded in linear contact with each other and the upper surface of the uppermost weight member is bonded in the bottom of the elastic bracket 140.

The weight 130 is coupled to a horizontal portion 110 of the seatback top frame 100 through the elastic bracket 140 when it is mounted on the seatback top frame 100 and is swung by inertia in a space 120 under the horizontal portion 110.

The seatback top frame 100 has a substantially S-like vertical cross-section at the center portion, so it has an upper space 121 and a lower space 122 surrounded by the seatback top frame 100. The upper end of the upper space 121 is surrounded by an upper horizontal portion 111 of the seatback top frame 100 and the upper end of the lower space 122 is surrounded by a lower horizontal portion 112 of the seatback top frame 100.

The weight 130 is mounted on the seatback top frame 100 to be positioned in at least one of the upper space 121 and the lower space 122, so the weight 130 is attached to at least one of the upper horizontal portion 111 and the lower horizontal portion 112.

When the weight 130 is attached to the horizontal portions 111 and 112 through the elastic bracket 140, only the upper end of the weight 130 is bonded in linear contact with the bottom 142 of the elastic bracket 140, for example, by welding, and the elastic bracket 140 is bonded in surface contact with the horizontal portions 111 and 112 of the corresponding spaces 121 and 122 where the elastic bracket 140 is disposed.

The weight 130 may be attached in surface contact with the bottom 142 of the elastic bracket 140, depending on the external shape.

Further, it is preferable that the elastic bracket 140 is bonded in surface contact with the horizontal portions 111 and 112 to be stably bonded to the horizontal portions 111 and 112.

The weight 130 is bonded to the elastic bracket 140 only on the upper end, that is, the upper end that is in linear contact with the flat bottom 142 of the elastic bracket 140 and the other portion except for the upper end is not fixed to any of the seatback top frame 100 and the elastic bracket 140, so the weight 130 is vibrated forward/backward by inertia when the seatback vibrates forward/backward, that is, it is vibrated opposite to the vibration of the seatback by inertia.

For example, when the seatback vibrating forward/backward moves backward, the weight 130 is moved forward by inertia, and when the seatback is moved forward, the weight 130 is moved backward by inertia, so the weight vibrates in the opposite direction to the vibration of the seatback. Accordingly, the elastic bracket 140 elastically supporting the weight 130 bends forward/backward on the seatback top frame 100, so it can offset the forward/backward vibration of the seatback.

The weight 130 functions as a pendulum weight when the seat vibrates, thereby being swung by inertia. Further, the upper side portion 141 of the elastic bracket 140 vibrates forward/backward with respect to the positions bonded to the horizontal portions 111 and 112 of the seatback top frame 100.

Further, the weight 130 swings in the spaces 121 and 122 of the seatback top frame 100.

The elastic bracket 140 is made of a material having elasticity and rigidity such as SPCC (steel plate cold commercial) to elastically support the pendulum motion of the weight 130 and is formed in a panel shape bending several times in a U-shape to ensure structural elasticity and rigidity.

Figure 4:
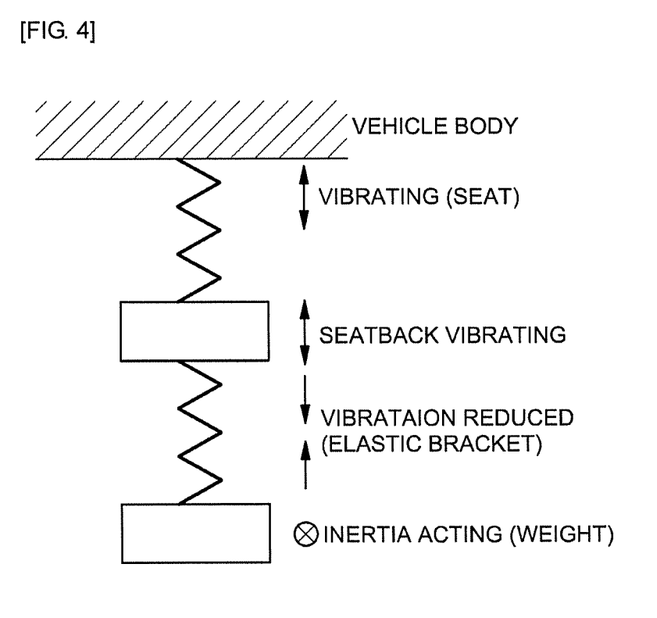
FIG. 4 shows a conceptual diagram for illustrating the operation principle of a vibration reduction device for a vehicle according to an embodiment of the present disclosure.

According to the vibration reduction device for a vehicle seat, as shown in FIG. 4, when the seat vibrates, the seatback also vibrates, in which the weight 130 elastically supported by the elastic bracket 140 is vibrated forward/backward by inertia. Accordingly, the elastic bracket 140 reduces the forward/backward vibration of the seatback by elastically bending forward/backward, whereby it is possible to suppress vibration of the seat.

Figure 5:
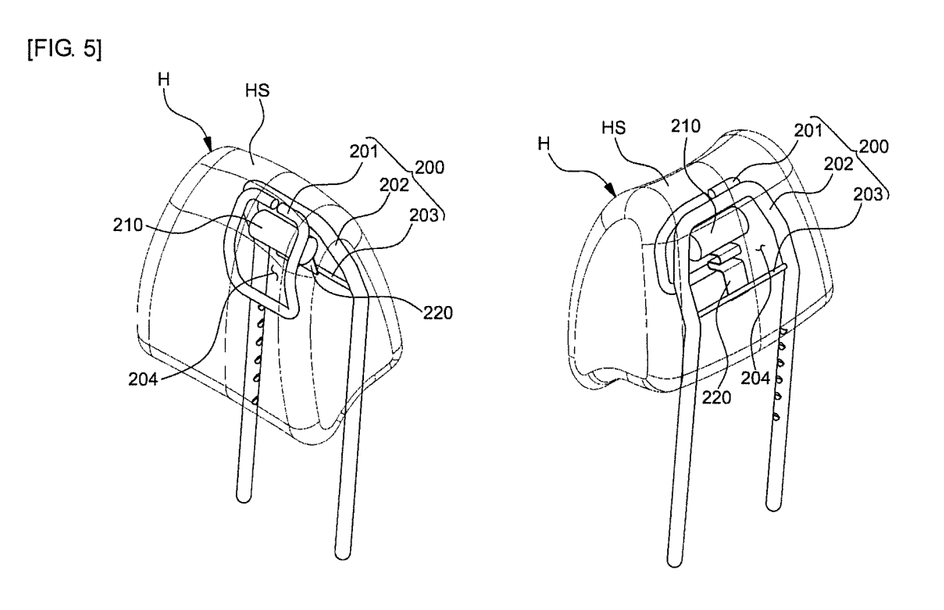
FIG. 5 shows a view showing a headrest equipped with a vibration reduction device for a vehicle seat according to another embodiment of the present disclosure.
Figure 6:
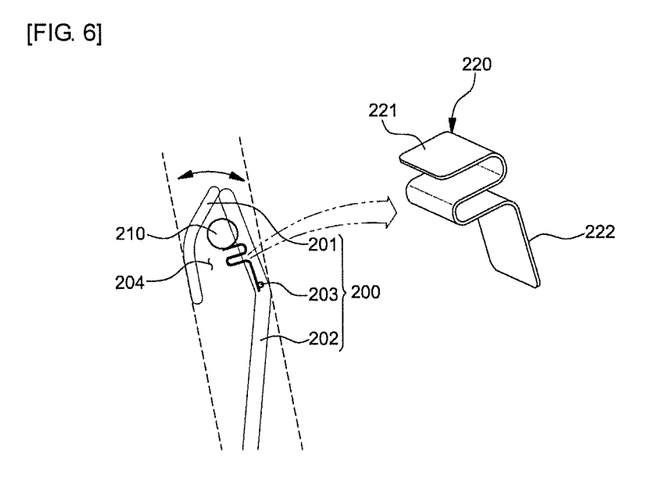
FIG. 6 shows a side view of a vibration reduction device for a vehicle seat according to another embodiment of the present disclosure.

On the other hand, FIG. 5 shows a view showing a headrest equipped with a vibration reduction device for a vehicle seat according to another embodiment of the present disclosure and FIG. 6 shows a side view of the vibration reduction device for a vehicle seat attached to a headrest frame.

As shown in FIGS. 5 and 6, in the vibration reduction device for a vehicle seat according to another embodiment of the present disclosure, a weight 210 is mounted on a headrest frame 200 through an elastic bracket 220.

That is, the vibration reduction device for a vehicle seat includes a weight 210 hung on a headrest frame 200 disposed in a headrest H of a vehicle seat and an elastic bracket 220 connected between the weight 210 and the headrest frame 200.

A headrest frame 200 that functions as the frame of the headrest is disposed inside a headrest skin HS providing a cushion effect in the headrest H and is composed of a front frame 201 and a rear frame 202.

The front frame 201 and the rear frame 202 are bonded by welding with upper ends in contact with each other, and a space 201 where the weight 210 can swing is formed between the frames.

The rear frame 202 is connected to the seatback top frame 100 through a pole guide 101 and has a lower cross member 203 transversely disposed at the center portion of the rear frame 202.

The lower cross member 203 may be integrally formed with or bonded to the rear frame 202 at a position facing the lower end of the front frame 201 and the weight 210 is mounted on the lower cross member 203 through the elastic bracket 220.

The weight 210, which is an object having predetermined weight, is hung on the lower cross member 203 through the elastic bracket 220 and is positioned in the space 204 between the front frame 201 and the rear frame 202 to be able to swing when the seat vibrates.

The weight 210 is a cylindrical body and of which only a portion of the outer side is bonded to the elastic bracket 220 in a linear contact type and the other portion is not fixed to any of the headrest frame 200 and the elastic bracket 220, so when the seat vibrates forward/backward, the headrest H vibrates forward/backward, whereby the weight is vibrated forward/backward by inertia.

The weight 210 is moved in the opposite direction to the vibration of the headrest H in the space 204 when being vibrated by inertia.

In detail, the weight 210 is mounted on the headrest frame 200 with only the lower end of the outer circumference surface of the weight 210 in linear contact with the top 221 of the elastic bracket 220 and the bottom 222 of the elastic bracket 220 in linear contact with the lower cross member 203.

The elastic bracket 220 may be in surface contact with the lower cross member 203, depending on the external shape of the lower cross member 203. However, when the elastic bracket 220 is bonded to the lower cross member 203 to be positioned in the space 204 of the headrest frame 200 to be able to elastically support the weight 210 in the space 204 so that the weight 210 can swing forward/backward.

Since the weight 210 is attached to the headrest frame 200 through the elastic bracket 220, it is swung by inertia while functioning as a pendulum weight when the seat vibrates and it can swing forward/backward in the space 204 of the headrest frame 200 with respect to the position bonded to the lower cross member 203 of the bottom 222 of the elastic bracket 220.

That is, the weight 210 is fixed to the top 221 of the elastic bracket 220 to swing forward/backward on the lower cross member 203 and may be made of a S20C (carbon steel).

The elastic bracket 220 is made of SPCC (steel plate cold commercial) to elastically support the forward/backward swinging of the weight 210 and is formed in a shape including a panel shape bending in an S-shape to be able to ensure structural elasticity and rigidity.

In detail, in the elastic bracket 220, the bottom 222 being bonded in the lower cross member 203 is formed in a flat plate shape and the top 221 being bonded in the weight 210 is formed in a flat plate shape perpendicular to the bottom 222, so the elastic bracket 220 has a cross-sectional structure bending in an S-shape between the top 221 and the bottom 222.

According to the vibration reduction device for a vehicle seat, when a seat vibrates, the headrest H also vibrates and the weights 130 and 210 elastically supported by the elastic bracket 220 are swung forward/backward by inertia, so the elastic brackets 140 and 220 reduce the forward/backward vibration of the headrest H by bending, whereby it is possible to suppress vibration of the seat.

According to the vibration reduction device for a vehicle seat, in order that the weights 130 and 210 can be swung forward/backward by inertia, the weights 130 and 210 are not directly attached to the seatback top frame 100 or the headrest frame 200, but attached through the elastic brackets 140 and 220 to be supported by the elastic brackets 140 and 220 when swinging. Accordingly, when the weights 130 and 210 are swung by inertia, the elastic brackets 140 and 220 bend in the opposite direction to vibration of the seat, so they can effectively reduce the forward/backward vibration of the seat by the law of action and reaction. Further, the seat vibrates out of the range of the natural frequency of the engine when the vehicle is stopped with the engine idling, so it is possible to suppress seat vibration in idling due to overlap of natural frequencies, whereby it is possible to effectively reduce forward/backward vibration of the seat.

In detail, when the vehicle is stopped with the engine idling, a seat vibrates and the seatback and the headrest also vibrate, so the weights 130 and 210 are swung forward/backward by inertia. Further, the elastic brackets 140 and 220 supporting the weights 130 and 210 elastically bend in the opposite direction to the vibration direction of the seatback and the headrest, thereby effectively reducing vibration of the seatback and the headrest by the law of action and reaction. Accordingly, the natural frequency of the seat including the seatback and the headrest changes out of the natural frequency of the engine that is being idling, so it is possible to effectively reducing vibration of the seat by suppressing seat vibration in idling due to overlap of natural frequencies.

Therefore, according to the vibration reduction device for a vehicle seat of the present disclosure, it is possible to reduce the weight of a weight and achieve equivalent performance of reducing vibration, as compared with the case in which only a weight is directly attached to a headrest frame in the related art.

Further, since the weight of a weight can be reduced and the installation position of the weight is changed, as compared with the related art, the vibration reduction device for a vehicle seat of the present disclosure can achieve the following effects.

1. The natural frequency of the vehicle seat does not overlap with the natural frequency of the idling engine of the vehicle.

2. It is possible to move up/down the headrest with less force, so the commercial value can be improved.

3. The return force when the seatback is moved forward/backward is decreased, so it is possible to prevent a user from being injured due to reaction that is generated when the seatback is returned.

4. The strength for preventing damage to a pole guide connected between a seatback and a headrest when shock is applied to the headrest is reduced, so it is possible to reduce the weight of the pole guide and decrease the material cost and the weight.

5. Smaller load is transmitted by the weight of the seat headrest, so the ability of the headrest to protect the passenger's neck is improved, thereby improving performance against shock.

In particular, the ability of the headrest to protect the passenger's neck is improved as compared with the related art even though the weight is mounted on the headrest frame, but it can be considerably improved as compared with the related art when the weight is mounted on the seatback top frame.

6. Since the manufacturing cost and weight are reduced, it is possible to improve fuel efficiency and profitability.

Further, the vibration reduction device for a vehicle seat of the present disclosure can be applied to various vehicles regardless of the types of vehicles. Furthermore, it is possible to avoid the natural frequencies of various engines by changing the natural frequency of a seat by adjusting the cross-sectional shape and position of the elastic bracket and the weight of the weight. Accordingly, it is possible to effectively reduce vibration by providing optimal specifications for various vehicles that are classified by the engine types having various natural frequencies (a gasoline engine, a diesel engine, and an LPG engine), the sizes of vehicles (a small vehicle, a midsized vehicle, and an RV), and the transmission types (a manual transmission and an automatic transmission).

In addition, although the embodiments of the present disclosure are described above in detail, the protection scope of the present disclosure is not limited thereto. Therefore, various changes and improved forms by those skilled in the art using basic concepts of the present disclosure defined in the following claims belongs to the protection scope of the present disclosure.

What is claimed is:

1. A vibration reduction device for a vehicle seat, wherein a weight having a predetermined weight is mounted on a frame of a seat in a vehicle to be able to swing forward/backward in the vehicle through an elastic bracket that can elastically bend, so when the weight swings, the elastic bracket reduces forward/backward vibration of the seat by bending forward/backward, wherein the elastic bracket is a panel repeatedly and alternately bent several times to have a plurality of U-shaped panels arranged alternate to each other.

2. The vibration reduction device of claim 1, wherein the frame is a seatback top frame or a headrest frame.

3. The vibration reduction device of claim 2, wherein when the weight is mounted on the seatback top frame, only the upper end of the weight is bonded to the bottom of the elastic bracket.

4. The vibration reduction device of claim 3, wherein the elastic bracket is disposed in a space surrounded by the seatback top frame.

5. The vibration reduction device of claim 4, wherein the top of the elastic bracket is bonded to a horizontal portion of the seatback top frame surrounding the upper end of the space.

6. The vibration reduction device of claim 3, wherein the weight is not fixed to any part except for the upper end being bonded to the elastic bracket to be swung forward/backward in the opposite direction to vibration of the seat by inertia when the seat vibrates forward/backward.

7. The vibration reduction device of claim 3, wherein the weight is mounted on the seatback top frame to be positioned in any one of an upper space and a lower space of the seatback top frame or in the upper space and the lower space.

8. The vibration reduction device of claim 2, wherein when the weight is mounted on the headrest frame, only the lower end of the weight is bonded to the top of the elastic bracket.

9. The vibration reduction device of claim 8, wherein the elastic bracket is bonded to a lower cross member of the headrest frame to be positioned in a space formed between a front frame and a rear frame of the headrest frame.

10. The vibration reduction device of claim 8, wherein the weight is not fixed to any part except for the lower end being bonded in the elastic bracket to be swung forward/backward in the opposite direction to vibration of the seat by inertia when the seat vibrates forward/backward.

11. The vibration reduction device of claim 1, wherein when the vehicle is stopped with an engine idling, the weight swings and the elastic bracket reduces forward/backward vibration of the seat by bending forward/backward.

* * * * *